US010287454B2

(12) United States Patent
Klotzbach et al.

(10) Patent No.: US 10,287,454 B2
(45) Date of Patent: May 14, 2019

(54) COATING COMPOSITIONS

(71) Applicant: EVONIK DEGUSSA GMBH, Essen (DE)

(72) Inventors: Thomas Klotzbach, Essen (DE); Michael Fiedel, Essen (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/906,365

(22) PCT Filed: Jul. 30, 2014

(86) PCT No.: PCT/EP2014/066374
§ 371 (c)(1),
(2) Date: Jan. 20, 2016

(87) PCT Pub. No.: WO2015/024748
PCT Pub. Date: Feb. 26, 2015

(65) Prior Publication Data
US 2016/0160081 A1 Jun. 9, 2016

(30) Foreign Application Priority Data

Aug. 23, 2013 (DE) .................. 10 2013 216 781

(51) Int. Cl.
C09D 183/06 (2006.01)
C09D 183/04 (2006.01)
C08G 77/18 (2006.01)
C08G 77/00 (2006.01)

(52) U.S. Cl.
CPC ......... *C09D 183/06* (2013.01); *C09D 183/04* (2013.01); *C08G 77/18* (2013.01); *C08G 77/80* (2013.01)

(58) Field of Classification Search
CPC .......... C09D 183/06; C08G 77/18; C07F 7/18
See application file for complete search history.

(56) References Cited

U.S. PATENT DOCUMENTS

| 4,339,563 | A | * | 7/1982 | Takago ............ C08L 83/14 528/14 |
| 5,908,909 | A | * | 6/1999 | De Buyl ............ C08K 5/057 525/474 |
| 7,598,334 | B2 | | 10/2009 | Ferenz et al. |
| 7,605,284 | B2 | | 10/2009 | Brueckner et al. |
| 7,635,581 | B2 | | 12/2009 | Ferenz et al. |
| 7,727,599 | B2 | | 6/2010 | Doehler et al. |
| 7,776,989 | B2 | | 8/2010 | Ferenz et al. |
| 7,825,207 | B2 | | 11/2010 | Ferenz et al. |
| 7,834,122 | B2 | | 11/2010 | Ferenz et al. |
| 7,855,265 | B2 | | 12/2010 | Thum et al. |
| 7,893,128 | B2 | | 2/2011 | Busch et al. |
| 7,964,694 | B2 | | 6/2011 | Ferenz et al. |
| 8,030,366 | B2 | | 10/2011 | Ferenz et al. |
| 8,138,294 | B2 | | 3/2012 | Henning et al. |
| 8,172,936 | B2 | | 5/2012 | Herrwerth et al. |
| 8,198,473 | B2 | | 6/2012 | Ferenz et al. |
| 8,211,972 | B2 | | 7/2012 | Meyer et al. |
| 8,277,555 | B2 | | 10/2012 | Atsuchi et al. |
| 8,420,748 | B2 | | 4/2013 | Henning et al. |
| 8,455,603 | B2 | | 6/2013 | Ferenz et al. |
| 8,466,248 | B2 | | 6/2013 | Meyer et al. |
| 8,486,677 | B2 | | 7/2013 | Thum et al. |
| 8,557,944 | B2 | | 10/2013 | Henning et al. |
| 8,617,529 | B2 | | 12/2013 | Herrwerth et al. |
| 8,685,376 | B2 | | 4/2014 | Czech et al. |
| 8,729,207 | B2 | | 5/2014 | Hartung et al. |
| 8,778,319 | B2 | | 7/2014 | Herrwerth et al. |
| 8,796,000 | B2 | | 8/2014 | Thum et al. |
| 8,802,744 | B2 | | 8/2014 | Knott et al. |
| 8,841,400 | B2 | | 9/2014 | Henning et al. |
| 8,883,932 | B2 | | 11/2014 | Brugger et al. |
| 8,916,511 | B2 | | 12/2014 | Maurer et al. |
| 8,946,369 | B2 | | 2/2015 | Henning et al. |
| 8,957,009 | B2 | | 2/2015 | Schubert et al. |
| 8,993,706 | B2 | | 3/2015 | Schubert et al. |
| 9,035,011 | B2 | | 5/2015 | Ferenz et al. |
| 2001/0041781 | A1 | * | 11/2001 | Reusmann ............ C08G 77/18 528/10 |
| 2006/0155090 | A1 | | 7/2006 | Ferenz |
| 2007/0059539 | A1 | | 3/2007 | Doehler et al. |
| 2007/0197678 | A1 | | 8/2007 | Cavaleiro et al. |
| 2008/0187702 | A1 | | 8/2008 | Ferenz et al. |
| 2010/0034765 | A1 | | 2/2010 | Herrwerth et al. |
| 2010/0210445 | A1 | | 8/2010 | Von Rymon et al. |
| 2010/0248325 | A1 | | 9/2010 | Eckstein et al. |
| 2011/0046305 | A1 | | 2/2011 | Schubert et al. |
| 2011/0118406 | A1 | | 5/2011 | Mowrer et al. |
| 2011/0230619 | A1 | | 9/2011 | Kuppert et al. |
| 2011/0251070 | A1 | | 10/2011 | Poffenberger et al. |
| 2012/0279922 | A1 | | 11/2012 | Haensel et al. |
| 2013/0035409 | A1 | | 2/2013 | Hubei et al. |
| 2013/0213267 | A1 | | 8/2013 | Fiedel et al. |
| 2013/0217930 | A1 | | 8/2013 | Haensel et al. |
| 2013/0259821 | A1 | | 10/2013 | Henning et al. |
| 2013/0267403 | A1 | | 10/2013 | Von Rymon et al. |
| 2013/0331592 | A1 | | 12/2013 | Hartung et al. |
| 2013/0345318 | A1 | | 12/2013 | Schubert et al. |

(Continued)

FOREIGN PATENT DOCUMENTS

DE 3412648 A1 10/1985
EP 0157318 A2 10/1985

(Continued)

OTHER PUBLICATIONS

German language International Search Report dated Oct. 21, 2014 in PCT/EP2014/066374 (3 pages).

(Continued)

*Primary Examiner* — Kuo Liang Peng
(74) *Attorney, Agent, or Firm* — Philip P. McCann; Nexsen Pruet, PLLC

(57) ABSTRACT

The present invention relates to coating compositions comprising A) alkoxy-functional arylpolysiloxanes and/or alkoxy-functional aryl-alkylpolysiloxanes, B) at least one crosslinking catalyst and optionally C) at least one alkoxysilane and D) optionally further auxiliaries and additives, where the fraction of the alkoxy groups is at least 10 wt %, based on the sum of components A) and C).

27 Claims, No Drawings

(56) References Cited

U.S. PATENT DOCUMENTS

2014/0303065 A1    10/2014  Jazkewitsch et al.
2015/0023900 A1    1/2015   Knott et al.
2015/0057369 A1    2/2015   Ferenz et al.
2015/0057412 A1    2/2015   Knott et al.

FOREIGN PATENT DOCUMENTS

| EP | 1142929 A2 | 10/2001 |
| EP | 0802236 B1 | 4/2002 |
| JP | H7-278497 A | 10/1995 |
| JP | H11-21509 A | 1/1999 |
| JP | 2006-036984 A | 2/2006 |
| WO | 2012003160 A1 | 1/2012 |

OTHER PUBLICATIONS

German language Written Opinion dated Oct. 21, 2014 in PCT/EP2014/066374 (5 pages).

International Search Report dated Oct. 21, 2014 in PCT/EP2014/066374 (2 pages).

\* cited by examiner

COATING COMPOSITIONS

This application is a national stage application under 35 U.S.C. § 371 of International Application No. PCT/EP2014/066374 filed 30 Jul. 2014, which claims priority to German Application No. DE 10 2013 216 781.4 filed 23 Aug. 2013, the disclosures of which are expressly incorporated herein by reference.

FIELD

The present invention relates to coating compositions comprising A) alkoxy-functional arylpolysiloxanes and/or alkoxy-functional aryl-alkylpolysiloxanes, B) at least one crosslinking catalyst and optionally C) at least one alkoxysilane and D) optionally further auxiliaries and additives, where the fraction of the alkoxy groups is at least 10 wt %, based on the sum of components A) and C).

BACKGROUND

High-temperature applications based on a purely physical drying principle usually require baking of the coating film at elevated temperatures, in order to obtain the necessary chemical and physicochemical stability. This is particularly disadvantageous, since the limitation on oven size means that not all materials can be subjected to forced drying. Furthermore, as the size of the object increases, it becomes increasingly difficult to achieve an object temperature of 150-250° C. as required for the baking operation.

In the prior art, silicone resin compositions are known which comprise substantially methoxy-functional methylsilicone resins. They are cured using, for example, titanium tetrabutoxide. One such process is described in EP 0802 236 B1, for example.

Alkoxy-functional methyl silicone resins such as SILRES® MSE 100, for example, have already been used here for many years, in combination with various curing catalysts, for coatings which cure at room temperature and possess high-temperature stability for temperature ranges up to 650° C.

In spite of the rapid cure rate of the methoxy-functional methylpolysiloxane resins, and the heat stability, they also have certain performance disadvantages for the paint formulator. For instance, the methylsilicone resins exhibit poor compatibility with other organic compounds, and, moreover, are very hard and brittle, as manifested particularly on thermal exposure of the cured coating.

For this reason, the majority of coatings for high-temperature application are made flexible by means of suitable, platelet-shaped fillers, such as mica, for example, and inorganic temperature-stable color pigments, to allow the sharp change in volume of the substrate on heating and cooling to be compensated. Furthermore, some methyl-silicone resins also exhibit an adverse effect on the coating system: for example, as a result of the PDMS character (PDMS=polydimethylsiloxane) of the methylsiloxanes, there may be surface defects, such as that known as cratering, for example.

An example of another manifestation of the incompatibility is that certain catalysts are completely unsuitable for use as crosslinking catalysts for alkoxy-functional methylsilicone resins, since the poor miscibility with the binder means that curing does not occur. For this reason, titanates, such as tetra-n-butyl titanate, for example, tend to be used for methylsilicone resins.

SUMMARY

It is an object of the present invention, therefore, to provide new coating systems which lead to stable coatings and do not have the disadvantages identified above.

DETAILED DESCRIPTION

The present invention accordingly first provides coating compositions comprising A) alkoxy-functional arylpolysiloxanes and/or alkoxy-functional aryl-alkylpolysiloxanes, B) at least one crosslinking catalyst and optionally C) at least one alkoxysilane and D) optionally further auxiliaries and additives, where the fraction of the alkoxy groups is at least 10 wt %, based on the sum of components A) and C).

The word fragment "poly", in the context of this invention, encompasses not only exclusively compounds having at least three repeating units of one or more monomers in the molecule, but also, in particular, those compositions of compounds that have a molecular weight distribution and possess an average molecular weight of at least 200 g/mol. This definition accounts for the circumstance that within the field of art in question it is common to identify such compounds as polymers even when they do not yet appear to satisfy the definition of a polymer as per OECD or REACH guidelines.

Within the compass of the invention, arylpolysiloxanes or alkylpolysiloxanes are understood to be compounds which in addition to Si—C linked aryl or alkyl groups may additionally contain other Si—C linked groups. This definition may also be applied mutatis mutandis to terms such as phenylpolysiloxane and phenyl resin, even if these terms are components of further terms.

Alkoxy-functional in the sense of the present invention means that in the polysiloxane there are alkyl groups bonded to silicon via oxygen (Si—O—R groups). Also understood synonymously in the context of the present invention are hydroxyl groups (Si—OH groups). Preferably, alkoxy-functional implies the presence of Si—O—R groups.

The systems of the invention have the advantage that when suitable curing catalysts are used they are able to condense fully at room temperature at a rate that is comparable with that of the methylpolysiloxane resins described above, yet they combine the advantages of the greater flexibility and particularly the outstanding compatibility with carbon-based organic binders, additives and other components.

The coating compositions of the invention comprise alkoxy-functional arylpolysiloxanes and/or alkoxy-functional aryl-alkylpolysiloxanes.

The alkoxy-functional arylpolysiloxanes and/or alkoxy-functional aryl-alkylpolysiloxanes present in accordance with the invention are more particularly those of the general formula (I):

$$R_a Si(OR')_b O_{(4-a-b)/2} \qquad (I)$$

in which $0<a<2$, $0<b<2$ and $a+b<4$ and

R is selected from an aromatic moiety having 6 to 20 carbon atoms or from a mixture of an aromatic moiety having 6 to 20 carbon atoms and an alkyl group consisting of 1 to 8 carbon atoms, and R' is an alkyl group consisting of 1 to 8 carbon atoms.

Examples of suitable alkyl groups R include methyl, ethyl, propyl, isopropyl, n-butyl, sec-butyl or tert-butyl groups. An aromatic moiety R may be a phenyl moiety, for example. Preferably R is selected from methyl or phenyl groups or from mixtures of methyl and phenyl groups, meaning that both methyl and phenyl groups are present in a polysiloxane.

Examples of suitable alkyl groups R' include methyl, ethyl, propyl, isopropyl, n-butyl, sec-butyl or tert-butyl groups. R' is preferably selected from methyl or ethyl groups. The latter are suitable particularly for phenylpolysiloxanes or phenyl-alkylpolysiloxanes which are identified as HAPS-free (Hazardous Air Pollutant Substance), which contain no solvents such as toluene, xylene or benzene and also release no methanol, instead only ethanol, in the hydrolysis-condensation crosslinking process that occurs even at room temperature.

Compounds of the formula (I) are frequently also referred to as silicone resins. This formula relates to the smallest unit of the averaged structural formula of the silicone polymer. The number of repetitions is evident from the number average $M_n$, as determined via GPC.

The preparation of silicone resins of these kinds is long-established in the literature (in this regard, see W. Noll—Chemie and Technologie der Silicone, Wiley-VCH Verlag GmbH & Co. KGaA, Weinheim, 1960), and is also described in German patent specification DE 34 12 648. Furthermore, EP 1142929 and EP 0157318 likewise describe the preparation of silicone resins.

In a first preferred embodiment of the present invention, component A) comprises alkoxy-functional aryl(alkoxysiloxanes), more particularly alkoxy-functional phenylpolysiloxanes (phenylsilicone resins) with R=Ph, in accordance with the general formula (I).

The fraction of the alkoxy groups is at least 5 wt %, based on the polysiloxane, preferably 10-70 wt %, more preferably 10-40 wt %, and very preferably 15-25 wt %.

The molecular weight $M_w$ of the aryl(alkoxysiloxanes) is more particularly 50-10 000 g/mol, preferably 200-3000 g/mol, very preferably 800-1700 g/mol.

The molecular weight $M_n$ of the aryl(alkoxysiloxanes) is more particularly 700-900 g/mol.

In a further preferred embodiment of the present invention, component A) of the coating compositions of the invention comprises alkoxy-functional aryl-alkylpolysiloxanes.

The molecular weight $M_w$ of the aryl-alkylpolysiloxanes is more particularly 50-200,000 g/mol, preferably 1000-50,000 g/mol, very preferably 1500-3500 g/mol.

The molecular weight $M_n$ of the aryl-alkylpolysiloxanes is more particularly 800-1200 g/mol.

In a further preferred embodiment of the present invention, component A) of the coating compositions of the invention comprises alkoxy-functional phenyl-methylpolysiloxanes (phenylmethylsilicone resins) with R=Ph, Me, in accordance with the general formula (I). Especially preferably the alkoxy groups are selected from methoxy or ethoxy groups. In the case of the solvent-free phenylmethyl silicone resins, the fraction of the alkoxy groups, more particularly of the methoxy and/or ethoxy groups, is at least 10 wt %, based on the polysiloxane, preferably 10-40 wt %, more preferably 10-30 wt %, and very preferably 13-25 wt %.

The phenyl:methyl ratio is generally in the range from 1:0.1 to 0.1:1, preferably in the range from 0.4:1 to 1:1.

In the context of the present invention, a monomer blend, composed for example of corresponding phenyltrialkoxysilanes and methylphenyldialkoxysilanes, is also understood to be a synonym for a phenylmethylpolysiloxane. A suitable example is a mixture of about 67 wt % phenyltrimethoxysilane and about 28 wt % methylphenyldimethoxysilane, as a monomer blend in the sense of the present invention.

The stated polysiloxanes may be present either as solvent-free 100% resin or else in the form of a corresponding resin solution, particularly in the case of the alkoxy-functional phenylmethylpolysiloxane resins with R=Ph, Me, for example methoxy-functional phenylmethylpolysiloxane resins, but also ethoxy-functional phenylmethylpolysiloxane resins. The solvent in question is preferably xylene, toluene, butyl acetate or methoxypropyl acetate (MPA).

Adding such solvents can reduce the viscosities of the polysiloxanes to make them easier to handle in the production of coating systems.

In the case of methoxy-functional phenylmethylpolysiloxane resins, in particular, the resin solutions have a silicone resin content of 30-99.99 wt %, preferably 60-99.99 wt %, more preferably ≥80 wt %, based on the solution. Where resin solutions are used, the molecular weight $M_w$ of the methoxy-functional phenylmethylpolysiloxane resins is more particularly 50-200 000 g/mol, preferably 3000-120 000 g/mol and more preferably 4000-70 000 g/mol.

The molecular weight $M_n$ of the methoxy-functional phenylmethylpolysiloxane resins is more particularly 1500-3900 g/mol.

In the case of resin solutions of ethoxy-functional phenylmethylpolysiloxane resins, the solids content is situated more particularly in the range of 50-99.99 wt %, preferably 80-99.99 wt % and more preferably ≥90 wt %, based on the resin solution. The fraction of alkoxy groups in this case is especially 10-70 wt %, preferably 10-30 wt %, more preferably 10-15 wt %. The molecular weight $M_w$ in this case is especially 50-10 000 g/mol, preferably 200-8000 g/mol, more preferably 500-2000 g/mol.

The molecular weight $M_n$ of the ethoxy-functional phenylmethylpolysiloxane resins is more particularly 800-1200 g/mol.

The fraction of component A) in the coating composition of the invention is more particularly 10 to 80 wt %, preferably 20 to 50 wt %, based on the coating composition. The aforementioned resins can also be used as mixtures of two or more resins in the context of the present invention.

All above-described resins which do not already themselves have a sufficiently high alkoxy functionality to make the alkoxy groups fraction at least 10 wt %, based on the sum of components A) and C), must be admixed by combination with further alkoxysilanes or else methylsilicone resins of corresponding alkoxy functionality as component C). Accordingly, in one embodiment of the present invention, the resins of component A) have an alkoxy groups fraction of more than 10 wt %, and need therefore not necessarily be admixed with alkoxysilanes of component C). If the alkoxy groups fraction of the alkoxysilanes is less than 10 wt %, then at least one alkoxysilane must be added as component C), until the alkoxy groups fraction is at least 10 wt %, based on the sum of components A) and C).

In this way, the catalyzed chemical crosslinking through hydrolysis-condensation reactions that occurs at room temperature and at a relative humidity in the 5-100% range occurs with a sufficiently high rate and leads to coatings with a high hardness, which are unachievable with silicone resin coatings that only dry physically.

Suitable alkoxysilanes C) are more particularly those of the formula (II)

$$R_cSi(OR')_d \qquad (II)$$

$0 \le c \le 2$, $1 \le d \le 4$, $c+d=4$
in which R is an alkyl group of 1 to 8 carbon atoms, a cycloalkyl group of 3 to 8 carbon atoms or an aromatic moiety having 6 to 20 carbon atoms, and R' is an alkyl group having 1 to 8 carbon atoms.

In the case of alkyl groups, they are selected more particularly from methyl, ethyl, propyl, isopropyl, n-butyl, sec-butyl or tert-butyl groups.

Suitable alkoxysilanes are more particularly tetramethoxysilane, tetraethoxysilane, phenyltriethoxysilane, phenyltrimethoxysilane, cyclohexyltrimethoxysilane, cyclohexyltriethoxysilane, cyclohexylmethyldimethoxysilane, cyclohexylmethyldiethoxysilane, propyltrimethoxysilane, propyltriethoxysilane, dimethyldimethoxysilane, dimethyldiethoxysilane, dimethoxyphenylmethylsilane and diethoxyphenylmethylsilane.

The alkoxysilanes can be used if required in amounts of 10-80 wt %, preferably 20-60 wt % and more preferably at 30-50 wt %, based on the mixture of components A) and C).

A further essential component of the coating composition of the invention is the at least one crosslinking catalyst B).

Catalysts which promote the curing of alkoxysilyl groups are well known to the skilled person. The following examples may be given: tin compounds such as tin diacetate, tin dioctoate, dibutyltin diacetylacetonate, dibutyltin dilaurate, tin tetraacetate, dibutyltin diacetate, dibutyltin dioctoate, dibutyltin dioleate, dimethoxydibutyltin, dimethyltin, dibutyltinbenzyl maleate, bis(triethoxysiloxy)dibutyltin, diphenyltin diacetate, titanium compounds, such as tetraethoxytitanium, tetra-n-propoxytitanium, tetraisopropoxytitanium, tetra-n-butoxytitanium, tetraisobutoxytitanium, tetrakis(2-ethylhexoxy)titanium, diisopropoxybis(ethylacetoacetato)titanium, dipropoxybis(acetylacetonato) titanium, diisopropoxybis(acetylacetonato)titanium, dibutoxybis(acetylacetonato)titanium, triisopropoxyallyltitanium acetate, isopropoxyoctylene glycol-titanium oxide or bis(acetylacetonato)titanium oxide, metalloaliphatic compounds, such as lead diacetate, lead di-2-ethylhexanoate, lead dineodecanoate, lead tetraacetate, lead tetrapropionate, zinc acetylacetonate, zinc 2-ethylcaproate, zinc diacetate, bis(2-ethylhexanoyl)zinc, zinc dineodecanoate, zinc diundecenoate, zinc dimethacrylate, tetrakis(2-ethylhexanoyl)zirconium dichloride, tetrakis(methacryloyl)zirconium dichloride and cobalt diacetate. Furthermore use may also be made of bismuth catalysts, examples being the catalyst known as the Borchi catalyst, iron(II) and iron(III) compounds, examples being iron(III) acetylacetonate or iron diacetate, aluminium compounds, an example being aluminium acetylacetonate, calcium compounds, an example being calcium ethylenediaminetetraacetate or magnesium compounds, an example being magnesium ethylenediaminetetraacetate, as catalysts.

Also suitable, furthermore, are amine structures, examples being triethylamine, tributylamine, aminopropyltrimethoxysilane, N-ethyldiisopropylamine, N-(2-aminoethyl)-3-aminopropyltrimethoxysilane, N,N-bis(N,N-dimethyl-2-aminoethyl)methylamine, N,N-dimethylcyclohexylamine, N,N-dimethylphenylamine or N-ethylmorpholine, guanidines such as 1,1,3,3-tetramethylguanidine, for example, or amidines such as, for example, 1,8-diazabicyclo[5.4.0]-7-undecene, 1,4-diazabicyclo[2.2.2] octane and 1,5-diazabicyclo[4.3.0]non-5-ene. Likewise catalytically active are tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Organic or inorganic Brønsted acids as well, such as methanesulphonic acid, p-toluenesulphonic acid, dodecylbenzenesulphonic acid, 1-naphthalenesulphonic acid, camphorsulphonic acid, acetic acid, trifluoroacetic acid or benzoyl chloride, hydrochloric acid, phosphoric acid, the monoesters and/or diesters thereof, such as, for example, butyl phosphate, (iso)propyl phosphate, dibutyl phosphate etc., are suitable as catalysts. Inorganic and organic Brønsted bases as well, such as sodium hydroxide, tetramethylammonium hydroxide, potassium hydroxide, or tetrabutylammonium hydroxide, for example, are suitable as catalysts. It is of course also possible to employ combinations of two or more catalysts.

So-called photolatent bases as well are known as crosslinking catalysts, as described in WO 2005/100482. Photolatent bases are preferably organic bases having one or more basic nitrogen atoms, which initially are present in a blocked form and which release the basic form only on irradiation with UV light, visible light or IR radiation, through splitting of the molecule.

Also catalytically active are catalysts which are sold by Dorf Ketal (formerly Du Pont) under the commercial designation Tyzor®. The same applies to catalysts of the Kenreact® (Kenrich), Borchi Kat® (Borchers) and K-Cure®/Nacure® (King Industries) types.

In order to ensure sufficiently rapid curing of the catalyst, it is very important that it is soluble in or readily miscible with the binder matrix to be cured, and, furthermore, is thoroughly distributed therein. It is obvious that both the molar mass of the catalyst and its chemical structure have an influence on the solubility/miscibility behavior.

Especially preferably the crosslinking catalyst B) contains no silicon atoms—in other words, the compounds in question are not compounds containing alkoxysilyl, silyloxy or silyl groups. The crosslinking catalyst B) is preferably selected from the group of the titanates and also of the nitrogen-containing compounds, preferably from the group of the guanidines or amidines. Particular mention may be made here of tetra-n-butoxytitanate (TnBT), 1,1,3,3-tetramethylguanidine (TMG) and 1,8-diazabicyclo[5.4.0]-7-undecene (DBU) as particularly preferred catalysts. Especially preferred for use are 1,1,3,3-tetramethylguanidine and also 1,8-diazabicyclo[5.4.0]-7-undecene (DBU), and also mixtures of 1,1,3,3-tetramethylguanidine or 1,8-diazabicyclo [5.4.0]-7-undecene (DBU) with tetra-n-butoxytitanate (TnBT).

The fraction of component B) in the coating composition of the invention is more particularly 0.1 to 15.0 wt %, preferably 0.1 to 3.0 wt %, based on component A) or on the sum of the fractions of components A) and C).

The prior art generally uses methoxy-functional methylsilicone resins with crosslinking catalysts from the group of the titanates such as tetra-n-butoxytitanate, for example. In the case of methoxy-functional phenylmethylpolysiloxanes and also their solutions, these systems either do not work at all or at best are only a tenth as rapid in curing as in the prior art for the methoxy-functional methylsilicone resins. In the case of the methoxy-functional phenylmethylsilicone resins, particularly suitable catalysts are those from the group of the nitrogen-containing compounds, preferably from the group of the guanidines or amidines, and here more particularly 1,1,3,3-tetramethylguanidine and also 1,8-diazabicyclo [5.4.0]-7-undecene (DBU). In comparison to tetramethylguanidine (TMG), DBU may be classed as an even stronger catalyst. Here as well, the combinations of TnBT with TMG or of TnBT with DBU are especially suitable. In the case of the HAPS-free phenylmethylpolysiloxanes, i.e., more particularly, ethoxy-functional phenylmethylpolysiloxanes, and resin solutions, the catalysts TMG and DBU are likewise suitable, and in this case DBU produces clear advantages in crosslinking rate in the case of the significantly less reactive ethoxy groups.

The coating composition of the present invention may further comprise further auxiliaries and additives as component D). The further auxiliaries and additives are selected more particularly from the group of the diluents, catalysts, plasticizers, fillers, solvents, emulsifiers, adhesion promoters, rheological additives, additives for chemical drying and/or stabilizers to counter thermal and/or chemical exposures and/or exposures through ultraviolet and visible light, thixotropic agents, flame retardants, blowing agents or defoamers, deaerating agents, film-forming polymers, antimicrobial compounds and preservatives, antioxidants, dyes, colorants and pigments, anti-freeze agents, fungicides, reactive diluents, complexing agents, wetting agents, co-crosslinkers, spraying assistants, active pharmacological ingredients, fragrances, radical scavengers and/or other adjuvants.

A suitable solvent may be selected from the group of the alkanes, alkenes, alkynes, benzene and aromatics with aliphatic and aromatic substituents, carboxylic esters, linear and cyclic ethers, molecules of entirely symmetrical construction, such as tetramethylsilane or, by analogy, carbon disulphide and, at high pressures, carbon dioxide as well, halogenated aliphatic or aromatic hydrocarbons, ketones or aldehydes, lactones (γ-butyrolactone), lactams (e.g. N-methyl-2-pyrrolidone or N-ethyl-2-pyrrolidone), nitriles such as acetonitrile, nitro compounds, tertiary carboxamides (N,N-dimethylformamide), urea derivatives such as tetramethylurea or dimethylpropyleneurea (DMPU), sulphoxides such as dimethylsulphoxide (DMSO), sulphones such as sulpholane, carbonic esters such as dimethyl carbonate or ethylene carbonate. Protic solvents may also be mentioned, such as water, methanol, ethanol, n- and isopropanol, and other alcohols, primary, secondary and tertiary amines, carboxylic acids, and primary and secondary amides such as formamide.

Other auxiliaries which may be included in the coating composition of the invention are fillers.

For coloring in the case of coating systems for high-temperature application, inorganic pigments are more particularly suitable, such as metal oxides or spinel pigments. Fillers which can be used include, in particular, mica, on account of its very high temperature stability and also its capacity to compensate the heat-induced change in volume of the substrate.

Furthermore, metal pigments such as aluminium bronzes or zinc dust can also be used. To enhance the corrosion control, the typical anti-corrosion pigments may be employed, such as zinc phosphates, for example.

Especially preferably the coating compositions of the invention have a fraction of component A) of 10 to 70 wt %, preferably 20 to 50 wt %, of component B) of 0.001 to 15 wt %, preferably 1 to 3 wt %, and of component C) of 10 to 80 wt %, preferably of 20 to 50 wt %, the sum totals of the stated fractions making 100 wt %.

The cure rates achieved with the coating compositions of the invention exceed many times the cure rates known from the prior art.

Additionally provided with the present invention are coating systems comprising coating compositions according to the present invention. The coating systems of the invention may include all kinds of coating systems known to the skilled person, more particularly paints, inks and varnishes.

In this context, in accordance with the invention, the components of the invention are generally combined with, where appropriate, the optional auxiliaries and additives, and are processed in accordance with the customary methods of manufacturing liquid surface-coating materials. Given sufficient alkoxy functionality, the polysiloxanes A) here are combined either on their own as component A), or in combination with alkoxysilanes C), with the optional additives D). This D) typically comprehends color-imparting pigments, fillers, thixotropic agents and solvents, which are added in succession, with stirring, to produce the coating system, i.e. more particularly the paint or the varnish, and which after primary dispersion using a dissolver are dispersed finely by means of a bead mill with agitator mechanism. Grinding on a bead mill disrupts the pigment agglomerates, in order thus to maximize the fine division of the pigments and the tinctorial strength. In the case of a one-component system, the crosslinking catalyst B) may be added either during letdown, in other words at the end of the paint preparation process shortly before the paint is dispensed into the container for transport, or else the catalyst is not added until immediately prior to the application of the coating system, as a second component. Whether a coating composition is employed preferably as a one-component or two-component system is dependent generally on the combination of the individual raw materials in the formula, and can be tested expertly for each formula by means of storage stability tests.

The coating system of the invention is applied generally by spray application, though it may also be applied by other techniques such as, for example, brushing, rolling, flow coating, dipping, spreading or pouring. Suitable substrates include metallic substrates such as, for example, steel, cast steel, stainless steel, hot-dip galvanized steel, aluminium, cast aluminium or copper. For improved adhesion, the substrate may be roughened by sandblasting or sanding. Non-metallic substrates such as glass or ceramics may also be employed.

The coating system of the invention that is applied to the substrate then cures with ingress of atmospheric moisture, through a catalyzed hydrolysis-condensation crosslinking process. Forced drying at elevated temperature and, at the same time, chemical crosslinking by hydrolysis-condensation, in combination, with sufficient moisture introduced into the oven, are not mutually exclusive. A further advantage of such coating systems admixed with a catalyst is that in closed containers they are not subject to any potlife problems, since the curing takes place only in the presence of water from the surrounding atmospheric humidity. In contrast to the conventional, purely physically drying, silicone resin-based coating systems, which must be baked at object temperatures of 250° C. for at least 30 minutes in order to achieve their full mechanical and chemical stability, a complete saving can be made here on the oven drying energy. The coating systems produced from the coating compositions of the invention cure fully by chemical crosslinking even at room temperature.

Even without further observations, it is assumed that a skilled person is able to utilize the above description to its widest extent. The preferred embodiments and examples are therefore to be interpreted merely as a descriptive disclosure which is by no means limiting in any way whatsoever. Where % figures are given in the context of the present invention, the figures in question are in weight % unless otherwise indicated. In the case of compositions, the % figures are based on the overall composition unless otherwise specified. Where average values are reported below, the values in question are numerical averages unless otherwise specified. Where measurement values are reported below, these values, unless otherwise specified, have been determined under a pressure of 101 325 Pa, with a temperature of 23° C. and with an ambient relative atmospheric humidity of approximately 40%.

The present invention is elucidated in more detail below using examples. Alternative embodiments of the present invention are obtainable in an analogous way.

EXAMPLES

General Methods and Materials

| | | |
|---|---|---|
| 1,1,3,3-Tetramethylguanidine (TMG), 99% | Cat. No. 241768 | Sigma-Aldrich Chemie GmbH Munich |
| 1,8-Diazabicyclo[5.4.0]-7-undecene (DBU), 98% | Cat. No. 139009 | Sigma-Aldrich Chemie GmbH Munich |
| Butyl titanate (TnBT) | TYZOR® TBT | Dorf Ketal B.V., Netherlands |
| Dynasylan 9165, Phenyltrimethoxysilane, PTMS, >98% | | Evonik Industries AG |
| Dynasylan MTMS, Methyltriethoxysilane, >98% | | Evonik Industries AG |
| Dynasylan 9265 Phenyltriethoxysilane, PTEOS, >97% | | Evonik Industries AG |
| Dynasylan A, Tetraethoxysilane (TEOS) | | Evonik Industries AG |
| Dynasylan PTEO, Propyltriethoxysilane | | Evonik Industries AG |
| Phenyltrichlorosilane, PTS | | Wacker Dow Corning |
| Methyltrichlorosilane, MTS | | Wacker Dow Corning |
| Decamethyl-cyclopentasiloxane (D5) Dow Corning 245 Fluid | | Dow Corning |
| SILRES® MSE 100 | Me—Si resin, 29 wt % methoxy groups $M_w$ = 2566 g/mol $M_n$ = 809 g/mol $M_w/M_N$ = 3.17 | Wacker |
| Resin 1 | Me—Si resin, 35 wt % methoxy groups $M_w$ = 746 g/mol $M_n$ = 531 g/mol $M_w/M_N$ = 1.4 | Evonik Industries AG |
| Resin 2 | Me/Ph—Si resin, 15 wt % methoxy groups $M_w$ = 1656 g/mol $M_n$ = 966 g/mol $M_w/M_N$ = 1.7 | Evonik Industries AG |
| Resin 3 | Me/Ph—Si resin, 25 wt % methoxy groups $M_w$ = 3050 g/mol $M_n$ = 1050 g/mol $M_w/M_N$ = 2.7 | Evonik Industries AG |
| Resin 4 | Me/Ph—Si resin, 17 wt % methoxy groups $M_w$ = 1220 g/mol $M_n$ = 780 g/mol $M_w/M_N$ = 1.6 | Evonik Industries AG |
| Resin 5 | Me/Ph—Si resin, 6 wt % methoxy groups, 85% in xylene $M_w$ = 4440 g/mol $M_n$ = 1769 g/mol $M_w/M_N$ = 2.5 | Evonik Industries AG |
| Resin 6 | Me/Ph—Si resin, 2 wt % methoxy group, 80% in xylene $M_w$ = 40 000-90 000 g/mol $M_n$ = 3260-3763 g/mol $M_w/M_N$ = 12-24 | Evonik Industries AG |
| Resin 7 | Me/Ph—Si resin, 14 wt % ethoxy groups, 91% in methoxypropyl acetate $M_w$ = 1790 g/mol $M_n$ = 1160 g/mol $M_w/M_N$ = 1.5 | Evonik Industries AG |
| Resin 8 | Ph—Si resin, 25 wt % ethoxy groups, $M_w$ = 940 g/mol $M_n$ = 740 g/mol $M_w/M_N$ = 1.3 | Evonik Industries AG |
| Resin 9 | Ph—Si resin, 17 wt % methoxy groups, $M_w$ = 1400 g/mol $M_n$ = 860 g/mol $M_w/M_N$ = 1.6 | Evonik Industries AG |

Drying Time Measurements:

A suitable means of assessing the catalytic activity of catalysts in a binder is to determine the drying time using a Drying Recorder. A test method of this kind is described by ASTM D5895. In analogy to this test method, drying time measurements were conducted using a BK3 Drying Recorder (The Mickle Laboratory Engineering Co. Ltd., Goose Green, Gomshall, Guildford, Surrey GU5 9LJ, UK). In this case, thin films of binder were applied to standard glass strips (30×2.5 cm×2 mm) using a four-way bar applicator (Erichsen Model 360). Beforehand, the standard glass strips were freed from adhering dust, dirt and grease with acetone and subsequently with an ethanol/DI water mixture. Using a lever on the reverse, the slide was then shifted leftwards into the start position. The scoring scribes were then folded down onto the sample glass plates. The test duration was set to 6, 12 or 24 hours, and measurement was commenced. After the end of the test duration, the scoring scribes were folded up and the glass plates were removed for assessment. The instants of initial drying and volume drying were read off using the associated timescale.

GPC Measurements:

GPC measurements for determining the weight average $M_w$, the number average $M_n$ and the polydispersity $M_w/M_n$ were carried out under the following measurement conditions: Column combination SDV 1000/10 000 Å (length 65 cm), temperature 30° C., THF as mobile phase, flow rate 1 ml/min, sample concentration 10 g/l, RI detector, alkoxy-functional polysiloxanes evaluated against polystyrene standard (162-2 570 000 g/mol).

a) Synthesis of Resins 1 to 9:

Resin 1:

In a method based on EP 0157318, a methoxy-functional methyl-silicone resin was prepared by hydrolysis and subsequent condensation of 559.7 g (3.74 mol) of trichloromethylsilane by means of a methanol/water mixture [373.1 g (11.64 mol) MeOH/67.2 g H$_2$O (3.71 mol)]. After the end of addition of the methanol/water mixture, the reaction mixture was distilled at 16 mbar. Analysis by $^1$H NMR gave a methoxy functionality of 35 wt %; the molar masses were found to be $M_w$=746 g/mol, $M_n$=531 g/mol, $M_w/M_n$=1.4.

Resin 2:

In a method based on EP 1142929, a methoxy-functional methyl-phenyl-silicone resin was prepared. For this purpose, 562.5 g (2.66 mol) of phenyltrichlorosilane (PTS) were first admixed slowly with 167.4 g (5.21 mol) of methanol. Then 122.5 g (0.27 mol) of decamethylcyclopentasiloxane (D5) were added, and at 50° C. 48.0 g (2.60 mol) of water were added dropwise. This was followed by vacuum distillation under a pressure <100 mbar at 60° C. Following inertization with nitrogen and addition of a further 100.0 g (3.12 mol) of methanol, stirring was continued for 30 minutes more, and then a further vacuum distillation was carried out. Analysis by $^1$H NMR gave a methoxy functionality of 15 wt %; the molar masses were found to be $M_w$=1656 g/mol, $M_n$=966 g/mol, $M_w/M_n$=1.7.

Resin 3:

In a method based on EP 1142929, a methoxy-functional methyl-phenyl-silicone resin was prepared. For this purpose, 419.4 g (2.81 mol) of methyltrichlorosilane were slowly admixed with 129.4 g (4.03 mol) of methanol with stirring. Subsequently 228.2 g (1.08 mol) of phenyltrichlorosilane (PTS) were added dropwise, during which the reaction mixture warmed to 35° C. Following the PTS addition, 249.9 g of a methanol/water mixture [186.4 g (5.82 mol) MeOH and 63.5 g (3.52 mol) $H_2O$] were added, followed by stirring finally for 2 hours and, after the end of the addition, by vacuum distillation at 16 mbar. Analysis by $^1$H NMR gave a methoxy functionality of 25 wt %; the molar masses were found to be $M_w$=3050 g/mol, $M_n$=1050 g/mol, $M_w/M_n$=2.7.

Resin 4:

In a method based on EP 1142929, a methoxy-functional methyl-phenyl-silicone resin was prepared. For this purpose, 576.5 g (2.73 mol) of phenyltrichlorosilane (PTS) were first admixed slowly with 172.4 g (5.38 mol) of methanol. Then 101.1 g (0.27 mol) of decamethylcyclopentasiloxane (D5) were added, and at 50° C. 49.2 g (2.73 mol) of water were added dropwise. This was followed by vacuum distillation under a pressure<100 mbar at 60° C. Following inertization with nitrogen and addition of a further 100.8 g (3.1 mol) of methanol, stirring was continued for 30 minutes more, and then a further vacuum distillation was carried out. Analysis by $^1$H NMR gave a methoxy functionality of 17 wt %; the molar masses were found to be $M_w$=1220 g/mol, $M_n$=780 g/mol, $M_w/M_n$=1.6.

Resin 5:

In a method based on EP 1142929, a methoxy-functional methyl-phenyl-silicone resin was prepared. For this purpose, 606.3 g (2.86 mol) of phenyltrichlorosilane were introduced, and a methanol/water mixture [59.4 g (1.80 mol) methanol and 18.07 g (1.00 mol) water] was added dropwise. Then 70.59 g (0.19 mol) of decamethylcyclopentasiloxane (D5) and 24.3 g (0.15 mol) of hexamethyldisiloxane were added to the reaction mixture, and again, at a temperature<50° C., a methanol/water mixture [69.9 g (2.12 mol) methanol and 50.8 g (2.82 mol) water] was added dropwise. Following the first vacuum distillation at about 50° C. and a pressure<100 mbar, the reaction mixture is held under reduced pressure for one hour more. Following further addition of 16.9 g of methanol (0.51 mol), distillation took place again under a pressure<100 mbar at 120° C. Analysis by $^1$H NMR gave a methoxy functionality of 6 wt %; the molar masses were found to be $M_w$=4440 g/mol, $M_n$=1769 g/mol, $M_w/M_n$=2.5. 83.6 g of xylene were used to adjust the resin content to 85 wt %.

Resin 6:

In a method based on EP 0 157 318 B1, a methoxy-functional methyl-phenyl-silicone resin was prepared. 858.5 g of resin 5 were introduced with 9.4 g (0.15 mol) of ethylene glycol, 14.3 g of xylene and 41.0 g (0.31 mol) of trimethylolpropane, 0.1 g of butyl titanate was added, and the mixture was heated to reflux. Distillation was then carried out, before the increase in viscosity, until a clear resin was obtained. After cooling to 120° C., first half of 40.76 g of isobutanol were added, and the remaining amount of isobutanol was added after further cooling to 105° C. Lastly, stirring took place at 60° C. for an hour more. Xylene is used to adjust the binder content to 80 wt %. Analysis by $^1$H NMR gave a methoxy functionality of 2 wt %; the molar masses were found to be $M_w$=40 000 to 90 000 g/mol, $M_n$=3260 to 3763 g/mol, $M_w/M_n$=12 to 24.

Resin 7:

In a method based on EP 1142929, an ethoxy-functional methyl-phenyl-silicone resin was prepared. For this purpose, first of all, 571.0 g (2.70 mol) of phenyltrichlorosilane were slowly admixed with 247.7 g (5.38 mol) of ethanol. Then 79.9 g (0.22 mol) of decamethylcyclopentasiloxane (D5) were added, and at 50° C. 60.5 g (3.36 mol) of water were added dropwise. This was followed by vacuum distillation under a pressure<100 mbar at 60° C. Following inertization with nitrogen and addition of a further 40.8 g (0.88 mol) of ethanol, stirring was continued for 30 minutes more, and then a further vacuum distillation was carried out. Analysis by $^1$H NMR gave an ethoxy functionality of 14 wt %; the molar masses were found to be $M_w$=1790 g/mol, $M_n$=1160 g/mol, $M_w/M_n$=1.5. 38.6 ml of methoxpropyl acetate were used to adjust the silicone resin content to 91%.

Resin 8:

In a method based on EP 1142929, an ethoxy-functional phenyl-silicone resin was prepared by the hydrolysis and subsequent condensation of 646.1 g (3.05 mol) of phenyltrichlorosilane by means of an ethanol/water mixture [296.3 g (6.43 mol) EtOH/57.5 g $H_2O$ (3.19 mol)]. After the end of the addition of the ethanol/water mixture, the reaction mixture was distilled at 16 mbar. Analysis by $^1$H NMR gave an ethoxy functionality of 25 wt %, and the molar masses were found to be $M_w$=940 g/mol, $M_n$=740 g/mol, $M_w/M_n$=1.3.

Resin 9:

In a method based on EP 1142929, a methoxy-functional phenyl-silicone resin was prepared by the hydrolysis and subsequent condensation of 745.6 g (3.53 mol) of phenyltrichlorosilane by means of a methanol/water mixture [184.3 g (5.76 mol) MeOH/70.1 g $H_2O$ (3.89 mol)]. After the end of the addition of the methanol/water mixture, the reaction mixture was distilled at 16 mbar. Analysis by $^1$H NMR gave a methoxy functionality of 17 wt %, and the molar masses were found to be $M_w$=1400 g/mol, $M_n$=860 g/mol, $M_w/M_n$=1.6.

b) Preparation of Coating Compositions

Coating compositions are prepared from resins as per a), crosslinking catalysts and optionally alkoxysilanes, by mixing of the constituents. The compositions are summarized in table 1.

TABLE 1

Inventive compositions (the percentages are wt % based on the overall mixture).

| Composition | Catalyst | [%] | Resin | [%] | Alkoxysilane 1 [%] | Alkoxysilane 2 [%] |
|---|---|---|---|---|---|---|
| C1.1* | TnBT | 1.5 | MSE 100 | 98.5 | | |
| C1.2* | TnBT | 1.5 | RESIN 1 | 98.5 | | |
| C2.1 | TMG | 1.0 | RESIN 2 | 99.0 | | |
| C2.2 | DBU | 1.0 | RESIN 2 | 99.0 | | |
| C2.3 | TnBT | 1.0 | TMG | 2.0 | RESIN 2 | 97.0 |
| C2.4 | TnBT | 1.0 | DBU | 1.0 | RESIN 2 | 98.0 |
| C2.5 | TMG | 2.0 | | | RESIN 2 | 68.6 | PTMS | 29.4 |
| C2.6 | DBU | 1.5 | TnBT | TMG | RESIN 2 | 68.95 | PTMS | 29.55 |

TABLE 1-continued

Inventive compositions (the percentages are wt % based on the overall mixture).

| Composition | Catalyst [%] | Resin [%] | Alkoxysilane 1 [%] | Alkoxysilane 2 [%] |
|---|---|---|---|---|
| C2.7 | 1.0 TnBT / 2.0 DBU | 67.9 RESIN 2 | 29.1 PTMS | |
| C2.8 | 1.0 TMG / 1.0 | 68.6 RESIN 2 | | 29.4 MTMS |
| C2.9 | 2.0 DBU | 68.6 RESIN 2 | | 29.4 MTMS |
| C2.10 | 1.5 TnBT TMG | 68.95 RESIN 2 | | 29.55 MTMS |
| C2.11 | 1.0 TnBT / 2.0 DBU | 67.9 RESIN 2 | | 29.1 MTMS |
| C2.12 | 1.0 TMG / 1.0 | 68.6 RESIN 3 | | 29.4 MTMS |
| C3.1 | 1.0 DBU | 99.0 RESIN 3 | | |
| C3.2 | 1.5 TnBT TMG | 98.5 RESIN 3 | | |
| C3.3 | 1.0 TnBT / 2.0 DBU | 97.0 RESIN 3 | | |
| C3.4 | 1.0 TMG / 1.0 | 98.0 RESIN 3 | | |
| C3.5 | 2.0 DBU | 68.6 RESIN 3 | 29.4 PTMS | |
| C3.6 | 1.5 TnBT TMG | 68.95 RESIN 3 | 29.55 PTMS | |
| C3.7 | 1.0 TnBT / 2.0 DBU | 67.9 RESIN 3 | 29.1 PTMS | |
| C3.8 | 1.0 TMG / 1.0 | 68.6 RESIN 3 | 29.4 PTMS | |
| C3.9 | 2.0 DBU | 68.6 RESIN 3 | | 29.4 MTMS |
| C3.10 | 1.5 TnBT TMG | 68.95 RESIN 3 | | 29.55 MTMS |
| C3.11 | 1.0 TnBT / 2.0 DBU | 67.9 RESIN 3 | | 29.1 MTMS |
| C3.12 | 1.0 TMG / 1.0 | 68.6 RESIN 3 | | 29.4 MTMS |
| C4.1 | 2.0 DBU | 98.0 RESIN 4 | | |
| C4.2 | 1.5 TnBT TMG | 98.5 RESIN 4 | | |
| C4.3 | 1.0 TnBT / 2.0 DBU | 97.0 RESIN 4 | | |
| C4.4 | 1.0 TMG / 1.0 | 98.0 RESIN 4 | | |
| C4.5 | 2.0 DBU | 68.6 RESIN 4 | 29.4 PTMS | |
| C4.6 | 1.5 TnBT TMG | 68.95 RESIN 4 | 29.55 PTMS | |
| C4.7 | 1.0 TnBT / 2.0 DBU | 67.9 RESIN 4 | 29.1 PTMS | |
| C4.8 | 1.0 TMG / 1.0 | 68.6 RESIN 4 | 29.4 PTMS | |
| C4.9 | 2.0 DBU | 49.0 RESIN 4 | 49.0 PTMS | |
| C4.10 | 1.5 TnBT TMG | 49.25 RESIN 4 | 49.25 PTMS | |
| C4.11 | 1.0 TnBT / 2.0 DBU | 48.5 RESIN 4 | 48.5 PTMS | |
| C4.12 | 1.0 TMG / 1.0 | 49.0 RESIN 4 | 49.0 | |
| C4.13 | 2.0 DBU | 68.6 RESIN 4 | | 29.4 MTMS |
| C4.14 | 1.5 TnBT TMG | 68.95 RESIN 4 | | 29.55 MTMS |
| C4.15 | 1.0 TnBT / 2.0 DBU | 67.9 RESIN 4 | | 29.1 MTMS |
| C4.16 | 1.0 TMG / 1.0 | 68.6 RESIN 4 | | 29.4 MTMS |
| C5.1 | 1.0 DBU | 49.5 RESIN 5 | 49.5 PTMS | |
| C5.2 | 1.0 TnBT TMG | 49.5 RESIN 5 | 49.5 PTMS | |
| C5.3 | 1.0 TnBT / 2.0 DBU | 48.5 RESIN 5 | 48.5 PTMS | |
| C5.4 | 1.0 TMG / 1.0 | 49.0 RESIN 5 | 49.0 | |
| C5.5 | 2.0 DBU | 49.0 RESIN 5 | | 49.0 MTMS |
| C5.6 | 1.5 TnBT TMG | 49.25 RESIN 5 | | 49.25 MTMS |
| C5.7 | 1.0 TnBT / 2.0 DBU | 48.5 RESIN 5 | | 48.5 MTMS |
| C5.8 | 1.0 TMG / 1.0 | 49.0 RESIN 5 | | 49.0 |
| C6.1 | 1.0 DBU | 49.5 RESIN 6 | 49.5 PTMS | |
| C6.2 | 1.0 TnBT TMG | 49.5 RESIN 6 | 49.5 PTMS | |
| C6.3 | 1.0 TnBT / 2.0 DBU | 48.5 RESIN 6 | 48.5 PTMS | |
| C6.4 | 1.0 TMG / 1.0 | 49.0 RESIN 6 | 49.0 | |
| C6.5 | 2.0 DBU | 49.0 RESIN 6 | | 49.0 MTMS |
| C6.6 | 1.5 TnBT TMG | 49.25 RESIN 6 | | 49.25 MTMS |
| C6.7 | 1.0 TnBT / 2.0 DBU | 48.5 RESIN 6 | | 48.5 MTMS |
| C6.8 | 1.0 TMG / 1.0 | 49.0 RESIN 6 | 49.0 PTMS | 49.0 MTMS |
| C6.9 | 2.0 DBU | 49.0 RESIN 6 | 24.5 PTMS | 24.5 MTMS |
| C6.10 | 1.5 TnBT TMG | 49.25 RESIN 6 | 24.63 PTMS | 24.62 MTMS |
| C6.11 | 1.0 TnBT / 2.0 DBU | 48.5 RESIN 6 | 24.25 PTMS | 24.25 MTMS |
| C6.12 | 1.0 TMG / 1.0 | 49.0 RESIN 6 | 24.5 PTEOS | 24.5 TEOS |
| C7.1 | 2.0 DBU | 49.0 RESIN 7 | 24.5 PTEOS | 24.5 TEOS |
| C7.2 | 2.0 TnBT TMG | 49.0 RESIN 7 | 24.5 PTEOS | 24.5 TEOS |
| C7.3 | 1.0 TnBT / 2.0 DBU | 48.5 RESIN 7 | 24.25 PTEOS | 24.25 TEOS |
| C7.4 | 1.0 TMG / 1.0 | 49.0 RESIN 7 | 24.5 Propyltriethoxysilane | 24.5 TEOS |
| C7.5 | 2.0 DBU | 49.0 RESIN 7 | 24.5 Propyltriethoxysilane | 24.5 TEOS |
| C7.6 | 1.5 TnBT TMG | 49.25 RESIN 7 | 24.63 Propyltriethoxysilane | 24.62 TEOS |
| C7.7 | 1.0 TnBT / 2.0 DBU | 48.5 RESIN 7 | 24.25 Propyltriethoxysilane | 24.25 TEOS |
| C7.8 | 1.0 TMG / 1.0 | 49.0 RESIN 7 | 24.5 | 24.5 TEOS |
| C8.1 | 2.0 DBU | 68.6 RESIN 8 | | 29.4 TEOS |
| C8.2 | 1.5 TnBT TMG | 68.95 RESIN 8 | | 29.55 TEOS |
| C8.3 | 1.0 TnBT / 2.0 DBU | 67.9 RESIN 8 | | 29.1 TEOS |
| C8.4 | 1.0 TMG / 1.0 | 68.6 RESIN 8 | | 29.4 TEOS |
| C8.5 | 2.0 DBU | 49.0 RESIN 8 | | 49.0 TEOS |
| C8.6 | 1.5 TnBT TMG | 49.25 RESIN 8 | | 49.25 TEOS |
| C8.7 | 1.0 TnBT / 2.0 DBU | 48.5 RESIN 8 | | 48.5 TEOS |
| C8.8 | 1.0 TMG / 1.0 | 49.0 RESIN 8 | | 49.0 PTEOS |
| C8.9 | 2.0 DBU | 49.0 RESIN 8 | | 49.0 PTEOS |
| C8.10 | 1.5 TnBT TMG | 49.25 RESIN 8 | | 49.25 PTEOS |

TABLE 1-continued

Inventive compositions (the percentages are wt % based on the overall mixture).

| Composition | Catalyst [%] | Resin [%] | Alkoxysilane 1 [%] | Alkoxysilane 2 [%] |
|---|---|---|---|---|
| C8.11 | 1.0 TnBT | 2.0 DBU | 48.5 RESIN 8 | 48.5 PTEOS |
| C8.12 | 1.0 TMG | 1.0 | 49.0 RESIN 8 | 49.0 PTEOS |
| C8.13 | 2.0 DBU | | 49.0 RESIN 8 | 24.5 TEOS | 24.5 PTEOS |
| C8.14 | 1.5 TnBT | TMG | 49.25 RESIN 8 | 24.63 TEOS | 24.62 PTEOS |
| C8.15 | 1.0 TnBT | 2.0 DBU | 48.5 RESIN 8 | 24.25 TEOS | 24.25 PTEOS |
| C8.16 | 1.0 TMG | 1.0 | 49.0 RESIN 8 | 24.5 | 24.5 |
| C9.1 | 2.0 DBU | | 68.6 RESIN 9 | 29.4 PTMS |
| C9.2 | 1.5 TnBT | TMG | 68.95 RESIN 9 | 29.55 PTMS |
| C9.3 | 1.0 TnBT | 2.0 DBU | 67.9 RESIN 9 | 29.1 PTMS |
| C9.4 | 1.0 TMG | 1.0 | 68.6 RESIN 9 | 29.4 |
| C9.5 | 2.0 DBU | | 68.6 RESIN 9 | | 29.4 TEOS |
| C9.6 | 1.5 TnBT | TMG | 68.95 RESIN 9 | | 29.55 TEOS |
| C9.7 | 1.0 TnBT | 2.0 DBU | 67.9 RESIN 9 | | 29.1 TEOS |
| C9.8 | 1.0 TMG | 1.0 | 68.6 RESIN 9 | | 29.4 MTMS |
| C9.9 | 2.0 DBU | | 68.6 RESIN 9 | | 29.4 MTMS |
| C9.10 | 1.5 TnBT | TMG | 68.95 RESIN 9 | | 29.55 MTMS |
| C9.11 | 1.0 TnBT | 2.0 DBU | 67.9 RESIN 9 | | 29.1 MTMS |
| C9.12 | 1.0 TMG | 1.0 | 68.6 | | 29.4 |
| C10.1 | 2.0 DBU | | 49.0 RESIN 2 | 49.0 RESIN 6 | |
| C10.2 | 1.5 TnBT | TMG | 49.25 RESIN 2 | 49.25 RESIN 6 | |
| C10.3 | 1.0 TnBT | 2.0 DBU | 48.5 RESIN 2 | 48.5 RESIN 6 | |
| C10.4 | 1.0 | 1.0 | 49.5 | 49.5 | |

*Non-inventive examples c) Performance Investigations

Certain compositions as per table 1 were investigated as coating compositions by means of drying experiments in the Drying Recorder (Type BK3). The results are shown in table 2.

TABLE 2

| Composition | Initial drying [h] | Volume drying [h] |
|---|---|---|
| C1.1* | <0.5 | 0.6 |
| C1.2* | <0.5 | 1.2 |
| C2.1 | 2.0 | 3.2 |
| C2.2 | <0.5 | 1.5 |
| C2.3 | <0.5 | 0.5 |
| C2.4 | 1.0 | 3.0 |
| C2.5 | 0.8 | 0.8 |
| C2.6 | 0.8 | 1.5 |
| C2.7 | 0.8 | 1.0 |
| C2.8 | 1.0 | 2.0 |
| C2.9 | 0.5 | 1.2 |
| C2.10 | <0.5 | 1.0 |
| C2.11 | <0.5 | 0.5 |
| C2.12 | <0.5 | 0.8 |
| C3.1 | <0.5 | <0.5 |
| C3.2 | <0.5 | <0.5 |
| C3.3 | <0.5 | <0.5 |
| C3.4 | <0.5 | <0.5 |
| C3.5 | 0.5 | <0.8 |
| C3.6 | <0.5 | <0.5 |
| C3.7 | <0.5 | <0.8 |
| C3.8 | 0.5 | 0.8 |
| C3.9 | <0.5 | <0.5 |
| C3.10 | <0.5 | <0.5 |
| C3.11 | <0.5 | <0.5 |
| C3.12 | <0.5 | <0.5 |
| C4.1 | 0.8 | 1.0 |
| C4.2 | 0.5 | 1.0 |
| C4.3 | <0.5 | 0.5 |
| C4.4 | 0.8 | 1.2 |
| C4.5 | 0.5 | 1.5 |
| C4.6 | 1.0 | 1.2 |
| C4.7 | <0.5 | 0.5 |
| C4.8 | 1.2 | 3.0 |
| C4.9 | 0.8 | 2.5 |
| C4.10 | 0.8 | 1.5 |
| C4.11 | <0.5 | 0.5 |
| C4.12 | 0.5 | 0.5 |
| C4.13 | 0.5 | 1.0 |
| C4.14 | 0.5 | 0.8 |
| C4.15 | <0.5 | 0.5 |
| C4.16 | 0.5 | 0.5 |
| C5.1 | <0.5 | 1.5 |
| C5.2 | <0.5 | 1.0 |
| C5.3 | <0.5 | 0.5 |
| C5.4 | 0.5 | 1.0 |
| C5.5 | <0.5 | <0.5 |
| C5.6 | <0.5 | <0.5 |
| C5.7 | <0.5 | <0.5 |
| C5.8 | <0.5 | <0.5 |
| C6.1 | <0.5 | 0.8 |
| C6.2 | 0.8 | 1.5 |
| C6.3 | <0.5 | 0.8 |
| C6.4 | <0.5 | 0.5 |
| C6.5 | <0.5 | <0.5 |
| C6.6 | <0.5 | <0.5 |
| C6.7 | <0.5 | <0.5 |
| C6.8 | <0.5 | <0.5 |
| C6.9 | <0.5 | <0.5 |
| C6.10 | <0.5 | <0.5 |
| C6.11 | <0.5 | <0.5 |
| C6.12 | <0.5 | <0.5 |
| C7.1 | 0.5 | 2.5 |
| C7.2 | <0.5 | <0.5 |
| C7.3 | 1.0 | 2.5 |
| C7.4 | 1.5 | 4.5 |
| C7.5 | 0.8 | 1.2 |
| C7.6 | 0.8 | 1.0 |
| C7.7 | 1.0 | 2.0 |
| C7.8 | 1.0 | 4.0 |
| C8.1 | 0.5 | 0.8 |
| C8.2 | 0.8 | 2.0 |
| C8.3 | 0.5 | 0.8 |
| C8.4 | 1.0 | 5.5 |
| C8.5 | 0.5 | 0.8 |
| C8.6 | 0.5 | 0.8 |
| C8.7 | 0.5 | 0.8 |
| C8.8 | 0.8 | 4.0 |
| C8.9 | 5.0 | 6.5 |
| C8.10 | 3.0 | 4.0 |
| C8.11 | 3.5 | 5.0 |
| C8.12 | 2.5 | 3.5 |
| C8.13 | 1.2 | 2.0 |
| C8.14 | 1.5 | 3.0 |
| C8.15 | 0.8 | 2.0 |
| C8.16 | 1.2 | 2.0 |
| C9.1 | <0.5 | 0.5 |
| C9.2 | <0.5 | 0.5 |
| C9.3 | 0.5 | 2.0 |
| C9.4 | 0.8 | 1.5 |
| C9.5 | 0.5 | 0.5 |

TABLE 2-continued

| Composition | Initial drying [h] | Volume drying [h] |
|---|---|---|
| C9.6 | <0.5 | <0.5 |
| C9.7 | <0.5 | 1.0 |
| C9.8 | <0.5 | <0.5 |
| C9.9 | <0.5 | <0.5 |
| C9.10 | <0.5 | <0.5 |
| C9.11 | <0.5 | <0.5 |
| C9.12 | <0.5 | 0.5 |
| C10.1 | <0.5 | 1.2 |
| C10.2 | <0.5 | <0.5 |
| C10.3 | <0.5 | <0.5 |
| C10.4 | <0.5 | <0.5 |

*Non-inventive examples

What is claimed is:

1. A coating composition comprising a mixture of
A) an alkoxy-functional arylpolysiloxane and/or alkoxy-functional aryl-alkylpolysiloxane comprising alkoxy groups;
B) a crosslinking catalyst selected from the group of the guanidines or amidines;
C) an alkoxysilane comprising alkoxy groups; and
D) optionally further auxiliaries and additives,
wherein the alkoxy groups is at least 10 wt %, based on the sum of components A) and C);
wherein the coating composition comprises from 10 to 70 wt % based on the mixture components A) and C) of alkoxy-functional arylpolysiloxanes and/or alkoxy-functional aryl-alkylpolysiloxanes; and
from 0.001 to 15 wt % based on the mixture components A) and C) of the crosslinking catalyst; and C) from 10 to 80 wt % based on the mixture components A) and C); and
wherein the alkoxy-functional arylpolysiloxanes and/or alkoxy-functional aryl-alkylpolysiloxanes are of the general formula (I):

  (I)

in which $0<a<2$, $1<b<4$ and $a+b<4$ and
R is selected from an aromatic moiety having 6 to 20 carbon atoms or from a mixture of an aromatic moiety having 6 to 20 carbon atoms and an alkyl group consisting of 1 to 8 carbon atoms, and
R' is an alkyl group consisting of 1 to 8 carbon atoms,
wherein the coating composition has full mechanical and chemical stability resulting from a combination of physical volume drying of less than 6.5 hours under a pressure of 101325 Pa, with a temperature of 23° C., and with an ambient relative atmospheric humidity of approximately 40% and, at the same time, chemical crosslinking by hydrolysis-condensation with sufficient moisture introduced into the oven.

2. The coating composition according to claim 1, wherein component A) comprises alkoxy-functional phenylpolysiloxanes.

3. The coating composition according to claim 2, wherein alkoxysilanes C) used are those of the formula (II)

  (II)

$0 \leq c \leq 2$, $1 \leq d \leq 4$, $c+d=4$
in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

4. The coating composition according to claim 1, wherein component A) comprises alkoxy-functional phenylmethylpolysiloxanes.

5. The coating composition according to claim 4, wherein the phenyl:methyl ratio is in the range from 1:0.1 to 0.1:1.

6. The coating composition according to claim 4, wherein alkoxysilanes C) used are those of the formula (II)

  (II)

$0 \leq c \leq 2$, $1 \leq d \leq 4$, $c+d=4$
in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

7. The coating composition according to claim 1, wherein the alkoxy-functional arylpolysiloxanes and/or alkoxy-functional aryl-alkylpolysiloxanes A) are present as solvent-free 100% resin or in the form of a resin solution.

8. The coating composition according to claim 7, wherein alkoxysilanes C) used are those of the formula (II)

  (II)

$0 \leq c \leq 2$, $1 \leq d \leq 4$, $c+d=4$
in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

9. The coating composition according to claim 1, wherein alkoxysilanes C) used are those of the formula (II)

  (II)

$0 \leq c \leq 2$, $1 \leq d \leq 2$, $c+d=4$
in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

10. The coating composition according to claim 9, wherein component A) comprises alkoxy-functional phenylmethylpolysiloxanes.

11. The coating composition according to claim 9, wherein the alkoxy-functional arylpolysiloxanes and/or alkoxy-functional aryl-alkylpolysiloxanes A) are present as solvent-free 100% resin or in the form of a resin solution.

12. The coating composition according to claim 1, wherein the crosslinking catalyst B) contains no silicon atoms.

13. The coating composition according to claim 1, wherein the fraction of component B) in the coating composition is 0.1 to 15.0 wt %, based on component A).

14. The coating composition according to claim 1, wherein the coating composition comprises further auxiliaries and additives as component D).

15. The coating composition according to claim 1, wherein the coating composition comprises a fraction of component A) of 30 to 50 wt % based on the mixture components A) to C),
of component B) of 0.1 to 3.0 wt % based on the mixture components A) to C), and
of component C) of 20 to 50 wt % based on the mixture components A) to C).

16. A coating system comprising coating compositions according to claim 1.

17. The coating systems according to claim 16, wherein the coating system is a paint, an ink or a varnish.

18. The coating composition according to claim 1, wherein the crosslinking catalyst B) is selected from the group of 1,1,3,3-tetramethylguanidine or 1,8diazabicyclo[5.4.0]-7-undecene.

19. The coating composition according to claim 1, wherein alkoxysilanes C) used are those of the formula (II)

$$R_c Si(OR')_d \quad (II)$$

$0 \leq c \leq 2$, $1 \leq d \leq 4$, $c+d=4$ in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

20. A coating composition consisting of a mixture of
A) an alkoxy-functional arylpolysiloxane and/or alkoxy-functional aryl-alkylpolysiloxane comprising alkoxy groups;
B) a crosslinking catalyst selected from the group of the guanidines or amidines;
C) an alkoxysilane comprising alkoxy groups; and
D) auxiliaries and additives,
wherein the alkoxy groups is at least 10 wt %, based on the sum of components A) and C);
wherein the coating composition comprises from 10 to 70 wt % based on the mixture components A) and C) of alkoxy-functional arylpolysiloxanes and/or alkoxy-functional aryl-alkylpolysiloxanes; and
from 0.001 to 15 wt % based on the mixture components A) and C) of the crosslinking catalyst; and C) from 10 to 80 wt % based on the mixture components A) and C); and
wherein the alkoxy-functional arylpolysiloxanes and/or alkoxy-functional aryl-alkylpolysiloxanes are of the general formula (I):

$$R_a Si(OR')_b O_{(4-a-b)/2} \quad (I)$$

in which $0<a<2$, $1<b<4$ and $a+b<4$ and
R is selected from an aromatic moiety having 6 to 20 carbon atoms or from a mixture of an aromatic moiety having 6 to 20 carbon atoms and an alkyl group consisting of 1 to 8 carbon atoms, and
R' is an alkyl group consisting of 1 to 8 carbon atoms,
wherein the coating composition has full mechanical and chemical stability resulting from a combination of physical volume drying of less than 6.5 hours under a pressure of 101325 Pa, with a temperature of 23° C., and with an ambient relative atmospheric humidity of approximately 40%, and, at the same time, chemical crosslinking by hydrolysis-condensation with sufficient moisture introduced into the oven.

21. The coating composition according to claim 20, wherein component A) is an alkoxy-functional phenylpolysiloxane.

22. The coating composition according to claim 20, wherein component A) is an alkoxy-functional phenylmethylpolysiloxane.

23. The coating composition according to claim 22, wherein the phenyl:methyl ratio is in the range from 1:0.1 to 0.1:1.

24. The coating composition according to claim 20, wherein the alkoxy-functional arylpolysiloxane or alkoxy-functional aryl-alkylpolysiloxane A) are present as solvent-free 100% resin or in the form of a resin solution.

25. The coating composition according to claim 20, wherein alkoxysilanes C) used are those of the formula (II)

$$R_c Si(OR')_d \quad (II)$$

$0 \leq c \leq 2$, $1 \leq d \leq 2$, $c+d=4$ in which R is an alkyl group of 1 to 8 carbon atoms, a cycloalkyl group of 3 to 8 carbon atoms or an aromatic moiety having 6 to 20 carbon atoms and R' is an alkyl group having 1 to 8 carbon atoms.

26. The coating composition according to claim 20, wherein the crosslinking catalyst B) contains no silicon atoms.

27. The coating composition according to claim 20, wherein the fraction of component B) in the coating composition is 0.1 to 15.0 wt %, based on component A).

* * * * *